US009007676B1

(12) United States Patent
Kastalsky et al.

(10) Patent No.: US 9,007,676 B1
(45) Date of Patent: Apr. 14, 2015

(54) MEMS ELECTROSTATIC DISPLAY

(71) Applicants: Alexander Kastalsky, Ocean, NJ (US); Anthony J. Campisi, Setauket, NY (US)

(72) Inventors: Alexander Kastalsky, Ocean, NJ (US); Anthony J. Campisi, Setauket, NY (US)

(73) Assignee: Copytele, Inc., Melville, NY (US)

(*) Notice: Subject to any disclaimer, the term of this patent is extended or adjusted under 35 U.S.C. 154(b) by 9 days.

(21) Appl. No.: 13/623,190

(22) Filed: Sep. 20, 2012

(51) Int. Cl.
G02B 26/00 (2006.01)
G09G 3/34 (2006.01)
G02B 26/02 (2006.01)

(52) U.S. Cl.
CPC .............. G02B 26/02 (2013.01); G02B 26/00 (2013.01); G09G 3/34 (2013.01); G09G 3/3433 (2013.01)

(58) Field of Classification Search
CPC ........ G02B 26/00; G02B 26/02; G02B 26/12; G09G 3/34; G09G 3/3433
USPC ........... 359/290–295, 298, 221.2, 224.1, 245, 359/847, 848, 850, 855; 345/84, 85, 97, 98, 345/108
See application file for complete search history.

(56) References Cited

U.S. PATENT DOCUMENTS

| 5,661,591 | A  | * | 8/1997  | Lin et al. .................. 359/290 |
| 6,535,318 | B1 | * | 3/2003  | Wood et al. ............... 359/225.1 |
| 6,600,474 | B1 | * | 7/2003  | Heines et al. .............. 345/108 |
| 6,867,897 | B2 | * | 3/2005  | Patel et al. ................ 359/291 |
| 6,870,659 | B2 | * | 3/2005  | Aubuchon .................. 359/291 |
| 6,873,450 | B2 | * | 3/2005  | Patel et al. ................ 359/291 |
| 7,158,278 | B2 |   | 1/2007  | Kastalsky |
| 7,362,492 | B2 |   | 4/2008  | Kastalsky |
| 7,518,781 | B2 | * | 4/2009  | Aubuchon .................. 359/290 |

OTHER PUBLICATIONS

Fabio Jutzi, et. al, Vertical Electrostatically 90 Turning Flaps for Reflective MEMS Display, Proc. of SPIE vol. 79300H-1, 2011.

* cited by examiner

*Primary Examiner* — Loha Ben
(74) *Attorney, Agent, or Firm* — Law Office of Carl Giordano, PC

(57) ABSTRACT

An electrostatic display employing MEMS (Micro-Electro-Mechanical System) technology is disclosed. The transition from white to black pixel color occurs as two cantilevers covering the pixel area are electrostatically turned from their position parallel to the substrate plane to the position normal to the substrate plane. Four electrode pixel control circuits are used to form row and column matrix. This matrix employs a bi-stability effect resulting from the difference in voltages needed to move the cantilever into an upright position and hold the cantilever in this position.

18 Claims, 10 Drawing Sheets (b)

|  | $V_{can} = V_{row} = V_{col} = V_{top}$ | |
|---|---|---|
| $V_{top} \geq V_{col}^{high}$<br>$V_{can} \leq V_{col}^{low}$ | $V_{col}^{low}$ | $V_{col}^{high}$ |
| $V_{row}^{low}$ / $V_{col}^{low}$ | No Movement | No Movement |
| $V_{row}^{low}$ / $V_{col}^{high}$ | No Movement | Move to On-state Vertical cantilever |
| $V_{row}^{high}$ / $V_{col}^{low}$ | Move to Off-state Horizontal cantilever | x |
| $V_{row}^{high}$ / $V_{col}^{high}$ | x | x |

Fig.5

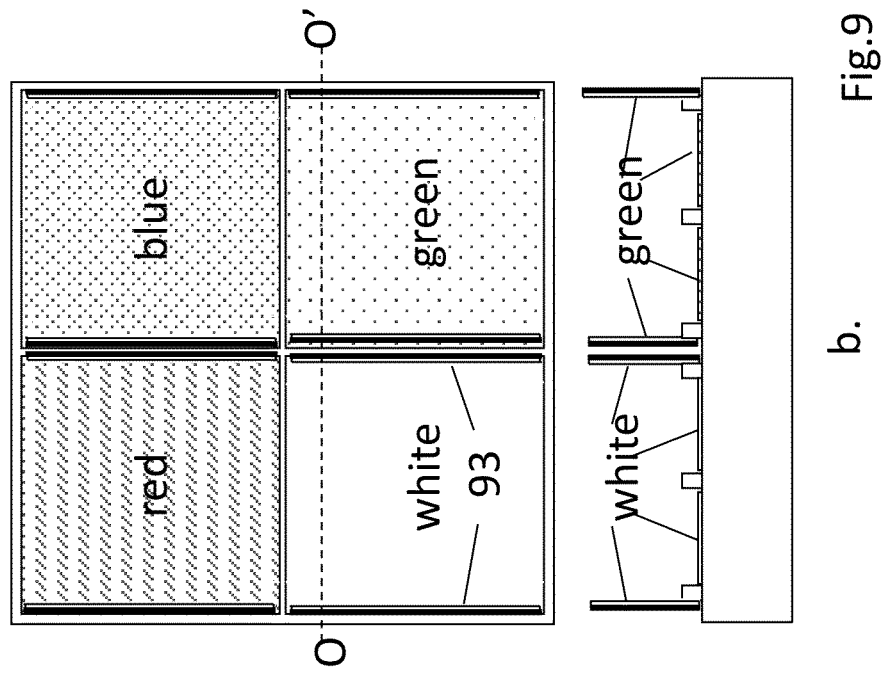
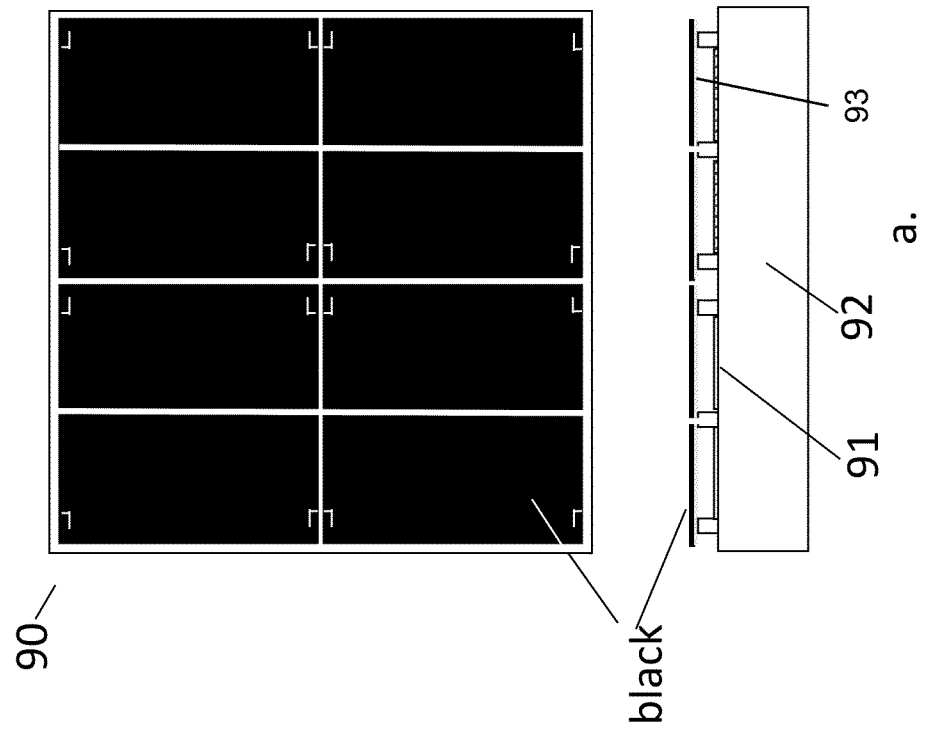
Fig.9

MEMS ELECTROSTATIC DISPLAY

BACKGROUND

1. Field of the Invention

The present invention relates to the electrostatic bi-stable display which utilizes Micro-Electro-Mechanical System (MEMS) technology.

2. Background of the Invention

The central idea of the invention is based on the electrostatic movement of the cantilevers from their original position parallel to the substrate plane (off-state) into the position normal to the substrate plane (on-state), thereby modulating light reflection from or light transmission through the display pixels. Electrostatic movement of cantilever pixel design is described in U.S. Pat. Nos. 7,158,278 and 7,362,492, the contents of which are incorporated by reference herein.

FIGS. 1a and 1b, which are comparable to FIG. 2 of the pixel design of the U.S. Pat. No. 7,158,278, illustrate the electrostatic movement of a cantilever assembly 24 as being accomplished by applying a voltage between two electrodes, 22 and 26. The electrode 22 is located on the cantilever (shorter) side while the electrode 26 is placed on the substrate 27. Under the voltage applied, the electrostatic attraction of these electrodes causes the cantilever 24 to rotate into a vertical position around the hinges (not shown) (see FIG. 1b). The cantilever 24 rests on the posts 25, which is typically 3-5 μm (micrometers or microns) tall, to provide a space for the cantilever rotation.

FIG. 2a illustrates a top view and FIG. 2b illustrates a cross-sectional view (through A-A of FIG. 2a) of a conventional cantilever activated display. FIG. 2a is comparable to FIG. 4 of U.S. Pat. No. 7,362,492. The typical hinges, constructed using a MEMS technology on the side of the cantilever, are shown in FIG. 2a, herein, as narrow stripes through which the cantilever is attached to the posts 41. Simultaneously, the stripes 42 provide the inter pixel electrical connection along the vertical direction.

The conventional MEMS technology employs placement of an additional, sacrificial, layer on the substrate to elevate the cantilever plane 3-5 μm above the substrate plane. When this layer is etched, the cantilever rests on the posts 41 and 40 (see FIGS. 2a and 2b).

Typically, in the vertical cantilever position, the inter-electrode capacitance becomes very high. This implies a low voltage is needed to hold the cantilever in the upright or vertical position in comparison with that voltage needed to move the cantilever into the vertical position. Such a bi-stability effect allows simple electrical pixel controlling scheme without AM TFT circuitry.

However, the estimates of the electrostatic force show that the active capacitance between electrodes 22 and 26 of FIG. 1a is too weak and will require unacceptably high voltages for the cantilever elevation. Therefore, the pixel construction must be redesigned to introduce new pixel features and thus overcome this problem.

SUMMARY OF THE INVENTION

To improve the performance of the cantilever and lower the voltage for the cantilever activation, the cantilever driving scheme and pixel design are modified, according to the present invention, to enhance the total inter electrode capacitance and thus increase the torque for the cantilever rotation. Thus, a first objective of the present invention is enhancement of the active capacitances to reduce the operational voltage and increase the speed of cantilever rotation.

To increase the pixel capacitances, a new approach, according to the present invention, is utilized, wherein a four-electrode pixel structure controls the cantilever movement thereby significantly increasing the active inter-electrode capacitance and thus both decreasing the driving voltages and improving the response time of the cantilever. In addition, the capacitance responsible for holding the cantilever in the up-right position is further increased by introducing material with a high dielectric constant $\in$ for the capacitance dielectric.

Another objective of the present invention is improvement of the pixel hinges, to reduce twisting force both during the membrane rotation and at the cantilever up-right position, which may cause a cantilever premature fatigue or even break. In the present invention, a mild, bending, force is applied to a specifically designed hinges to minimize these adverse features. Thus, alteration of the hinges represents another objective of the present invention.

Still another improvement is related to obtaining gray levels. In a display constructed from the present invention, a new design has been adopted in which every cantilever is subdivided into sub-pixels of a different size thus, providing a relatively large number of the gray levels. This improvement represents another object of the present invention.

Still another important parameter of the display is the speed of forming an image on the screen. To minimize the image producing time, according to the present invention, the cantilevers could contain a plurality of small holes to reduce the air drag during the cantilever moving process.

An aspect of the proposed MEMS display is its very low power consumption: a small amount of power is spent only during the process of placing an image on the screen. This feature provides a long life time of operation without recharging the battery, a key factor for the e-paper display. Additional incorporation of a solar battery to the invented display to constantly recharge the main display battery whenever the screen is exposed to light is another object of the present invention.

In still another aspect of the invention, the whiteness of the screen, and thus the contrast ratio, according to the present invention, may be improved by the cantilevers being coated with the white particles containing a mixture of the fluorescent particles emitting light within the white range of the spectrum under the ultra-violet portion of illumination from an ambient light.

Another aspect of the display according to the present invention shows a large pixel aperture leading to a potentially high value of on/off pixel contrast. All these display characteristics make the proposed display attractive for manufacturing of electronic book displays with extremely high performance characteristics.

BRIEF DESCRIPTION OF THE DRAWINGS

The advantages, nature, and various additional features of the invention will appear more fully upon consideration of the illustrative embodiments to be described in detail in connection with accompanying drawings wherein like reference numerals are used to identify like element throughout the drawings:

FIG. 5 illustrates a pixel state control table in accordance with the principles of the invention.

FIG. 6 illustrates a cantilever hinge design, wherein FIG. 6a illustrates a conventional cantilever hinge design, FIG. 6b illustrates a side view of a cantilever hinge design in accordance with the principles of the invention and FIG. 6c illustrates a perspective view of a cantilever hinge design in accordance with the principles of the invention.

FIG. 9 illustrates a pixel with color sub-pixels in accordance with the principles of the invention, wherein FIG. 9a illustrates a top view and a side view of a two cantilever pixel in a closed position and FIG. 9b illustrates a top view and a side view of a two cantilever pixel in an open position.

It is to be understood that the figures and descriptions of the present invention described herein have been simplified to illustrate the elements that are relevant for a clear understanding of the present invention, while eliminating, for purposes of clarity many other elements. However, because these elements are well-known in the art, and because they do not facilitate a better understanding of the present invention, a discussion of such element is not provided herein. The disclosure herein is directed to also variations and modifications known to those skilled in the art.

DETAILED DESCRIPTION OF THE INVENTION

As it was discussed above, the original pixel design employed only one capacitance at the edge of the cantilever for its electrostatic rotation from a horizontal to a vertical position. In the horizontal position, the capacitance is small, due to a relatively large inter-electrode distance and to initial non-parallel electrode configuration. As the cantilever starts rotating into an up-right (or vertical) position the electrodes approach each other and capacitance (and therefore electrostatic force of electrode attraction) increases and reaches its maximum at the vertical cantilever position. This increase in capacitance manifests itself as a bi-stability effect which implies that the voltage to hold the cantilever in the vertical position is significantly lower than that needed to move the cantilever into this position from initial horizontal state.

Figure 1:
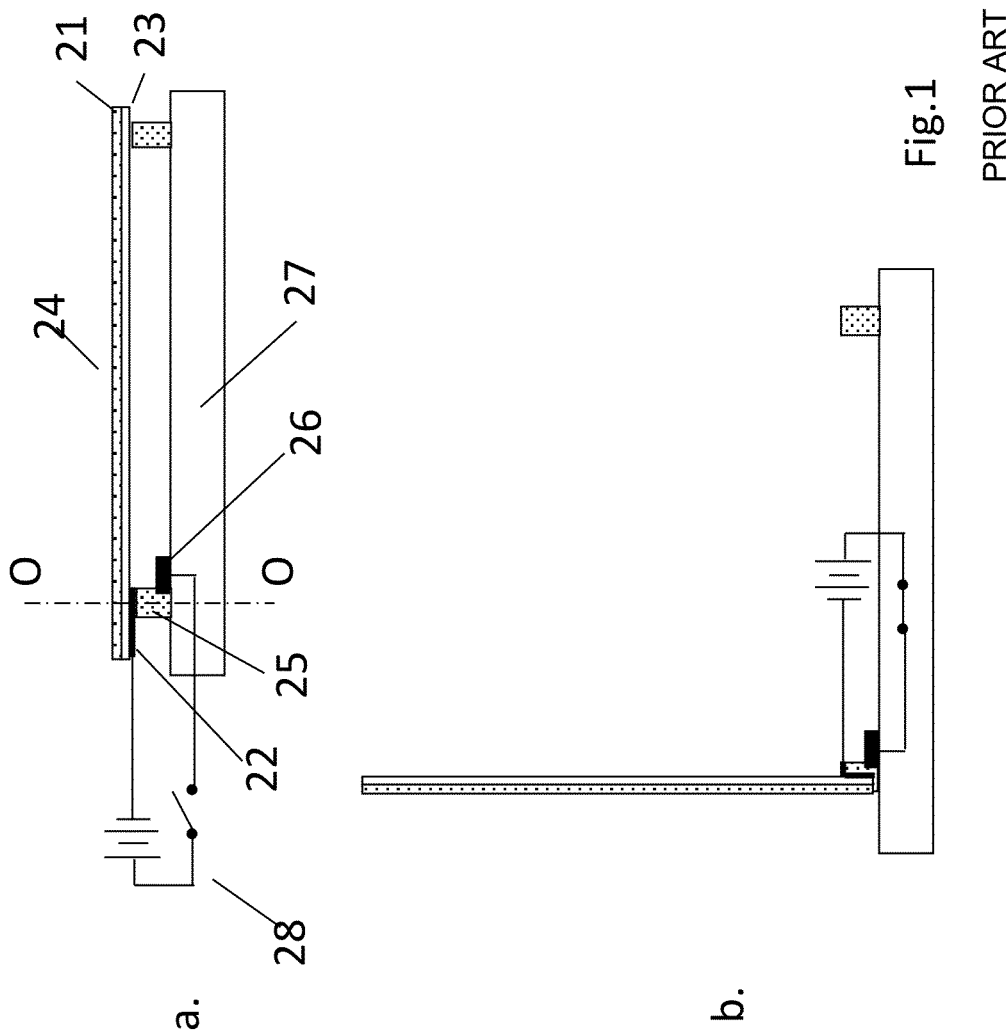
FIGS. 1a and 1b illustrate a conventional pixel structure having one cantilever per pixel in a closed and open position, respectively.
Figure 2:
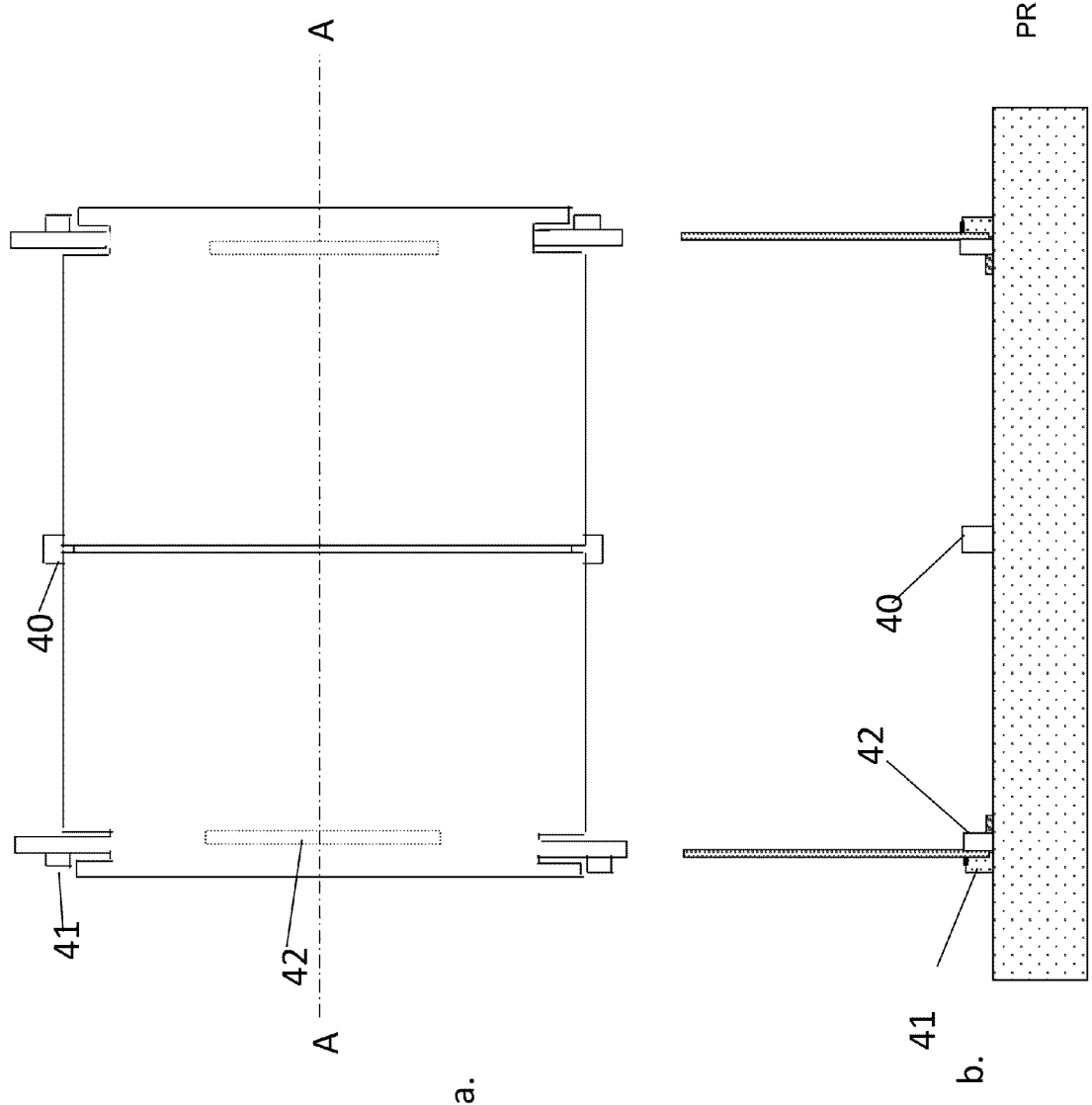
FIGS. 2a and 2b illustrate a top view and side view of the conventional pixel structure with two cantilevers per pixel in a closed and open position, respectively.
Figure 3:
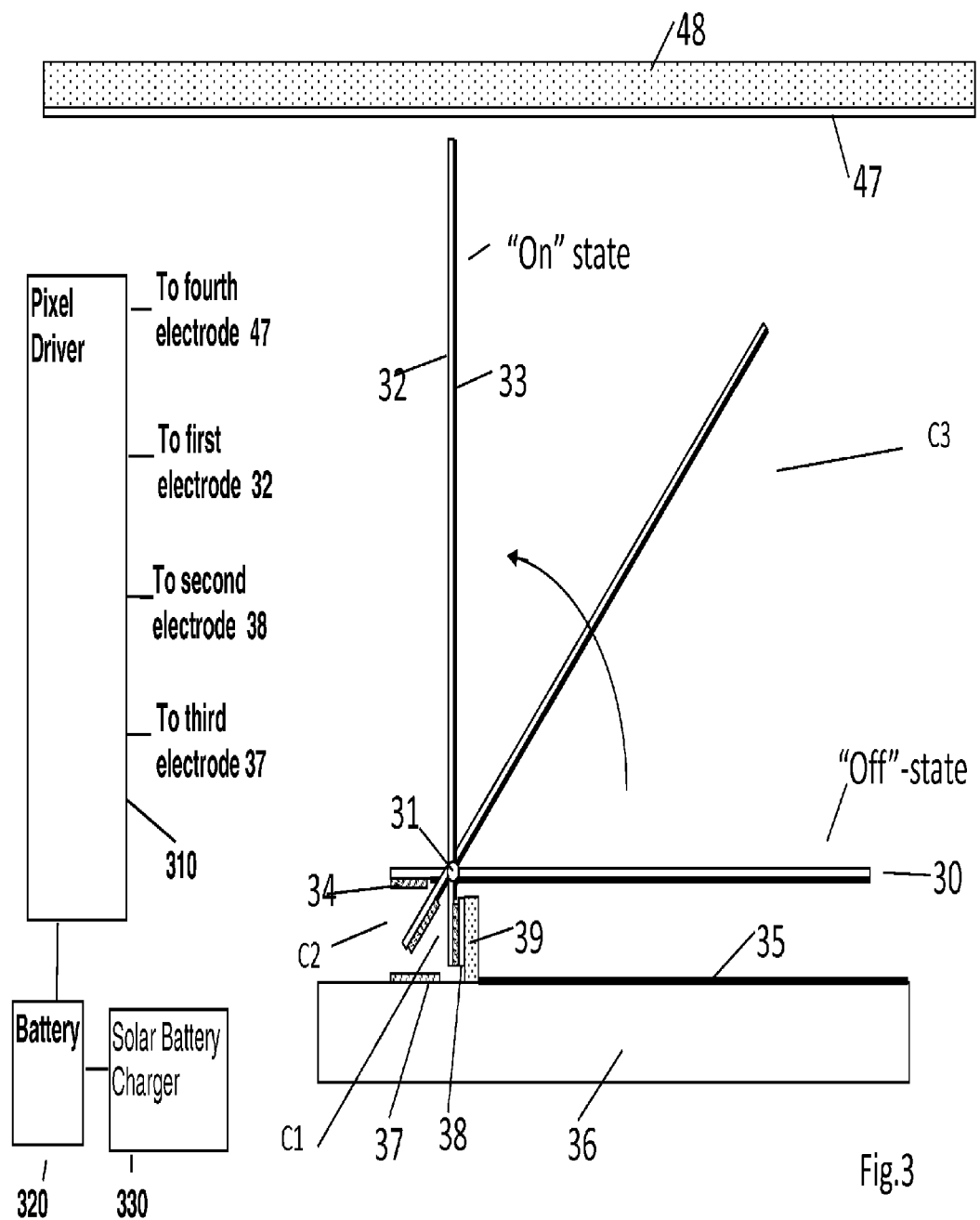
FIG. 3 illustrates a four electrode pixel design in accordance with the principles of the invention.

FIG. 3 illustrates the improved version of the pixel structure in accordance with the principles of the invention. In this illustrated embodiment of a pixel structure, three positions of the cantilever 30 are shown for rotating the cantilever 30 counterclockwise (direction of arrow) from an off-state to an on-state around the rotation means 31. The rotation means 31 schematically illustrates the center of rotation of the cantilever 30 and the place where a resilient force of a hinge is applied. The cantilever 30 consists of several layers: a top conducting layer 32, a bottom dielectric layer 33 and an additional dielectric layer 34 at one end of the cantilever 30, representing a material with high dielectric constant E, such as $HfO_2$. In the illustrated design, the top cantilever surface 32 is coated white to create a white color screen in the off-state, while the bottom surface 33, together with the top surface 35 of the substrate 36, are coated black to produce, a black color in the on-state. The combination of the two black surfaces 33 and 35 increases both the viewing angle of the display and the pixel blackness in the on-state.

The short metal portion of the cantilever 30 (illustrated to the left of the rotation means 31) with the high-∈ material 34 represents a first cantilever active electrode to form two capacitors: C1 and C2. The metal layer 38 deposited on the rectangular dielectric bar 39, which extends normally to the drawing plane throughout the display, represents a second active electrode to form the first capacitance C1 which includes high-∈ material 34. This first capacitance is essentially the same one utilized in the above cited patents to rotate the cantilever. The addition of the high-∈ dielectric 34 provides for a greater capacitance level, particularly in the vertical cantilever position. In the off-state, (i.e., when the cantilever is horizontal to the substrate 36), the capacitor C1 is small due to the high inter electrode distance and perpendicular electrode configuration. The high-∈ material in this case does not play a significant role. The high ∈ material becomes important when the electrodes 32 and 38 become close as the cantilever 30 approaches a vertical position.

To enhance the pixel capacitance, an additional bottom metal layer 37 is placed on the substrate 36 to form a second active electrode. In the off-state, electrode 37 and 32 are parallel to each other and, therefore, the capacitance C2 is larger than the capacitance C1. As would be recognized, the capacitance C2 has its maximum when the pixel is in the off-state and decreases as the cantilever moves to a vertical position (i.e., on-state). Hence, the capacitance C2 plays an important role for the initial cantilever lifting, while the capacitor C1 is important to hold the cantilever 30 in the up-right position.

To further enhance the total pixel capacitance, another, a fourth, electrode 47 is placed on the transparent cover 48 of the display. The electrode 47 is made from the optically transparent material, such as ITO, and extends over the entire display area. The distance between the top surface electrode 32 of cantilever 30 in a horizontal position and the top electrode 47 is chosen to accommodate the cantilever length in its on-state. The electrode 47 together with the first electrode 32 forms a third pixel capacitance C3. Although the inter-electrode distance in this case is large, the electrode areas are proportionally higher than those used in forming capacitances C1 and C2. Thus, the value of C3 is comparable to the values of C1 and C2.

In the initial (off-state) geometry the electrodes 47 and 32 are parallel to each other and, hence, the capacitance C3 is at its maximum. Capacitance C3 is important for lifting the cantilever from its off-state position. A constant voltage applied to the electrode 47 to form capacitance C3 can be higher than that applied to the electrodes that form capacitances C1 and C2. The voltages applied to the capacitances C1 and C2 through the row and column lines originate from the pixel drivers to form an image on the screen, and therefore should not exceed the output voltages of the available drivers.

When the cantilever moves closer to its up-right position, the capacitances C2 and C3 decrease, together with corresponding cantilever rotating torques, whereas the capacitance C1 becomes higher and further increases with the angle of rotation. Thus, the capacitance C1 alone can hold the cantilever in the vertical position, with the voltage significantly reduced from its initial values (effect of bi-stability).

Thus, the combination of capacitances C1, C2 and C3 serves to increase the cantilever 30 moving force and minimize the applied voltages. Analysis shows that for a reasonable length of the short portion of the cantilever around 3-5 µm and the cantilever total size of 100×50 µm, the driving voltages in the range of approximately 30V applied to electrodes 38 and 37 relative to the electrode 32 (i.e., capacitances C1 and C2) and a constant voltage in the range of less than 100V applied to the electrode 47 relative to the electrode 32 (i.e., the capacitance C3) are sufficient to move cantilever 30 from an off-state to an on-state. On the other hand, holding the cantilever in the up-right position requires only about 5-10V, the latter being applied only to the electrodes 32 and 38 forming C1.

The described above bi-stability effect allows building a simple pixel driving scheme without use of Active Matrix TFT circuit.

FIGS. 4a and 4b illustrate an exemplary display 400 comprising two pixels in a conventional row and column matrix configuration, in according with the principles of the invention. In this illustrative example each pixel includes two cantilevers 30 shown by dashed lines (i.e., a left and a right cantilever). FIG. 4(a) illustrates a top view of the exemplary display including two pixels and FIG. 4(b) illustrates a cross-sectional view of a pixel. In this illustrated display, the cantilever assembly is composed of a right cantilever and a left cantilever, each extending from an attachment point on a dielectric wall position substantially along opposite edges to the pixel to a center of the pixel. The cantilever assembly is shown in dashed lines.

Also illustrated are two sets of metal lines 45 that form two row lines Row1 and Row2 deposited on the substrate 36 and extend horizontally through the entire active device area. These metal lines 45 contain vertical branches 37 connected to the respective row lines 45 and are electrically isolated from other row lines of the display. Two such vertical branches 37 are included in each pixel. Thus, each cantilever 30 faces at one of its sides, vertical metal branch 37 of the row line (FIG. 4(a)).

The vertical dielectric bars 39 (two per pixel) with the metal lines 38, deposited on the one of the walls of the bar 39, extend vertically throughout the display matrix, thereby forming the column lines. Every metal line 38 on the bar 39 relates to the corresponding metal line 37 on the substrate (see FIG. 4(b)), so that left and right cantilevers at every pixel are endowed with symmetrical two-electrode metal line structures made at the pixel sides. For two cantilevers of the same pixel, the lines 38 are connected to each other beyond the active area (not shown), so that both cantilevers in the pixel operate synchronously. To avoid electrical shorts between lines 45 and 38 at their intersection, the line 38 at each vertical wall does not extend to the substrate, see FIG. 4(b).

The basic electrode is made on the cantilever 30 itself. As discussed above (FIG. 3), this electrode consists of the top white coated metal layer 32, the bottom black film 33 and a high-$\in$ dielectric material 34 over a small portion of the cantilever active side.

Figure 4:
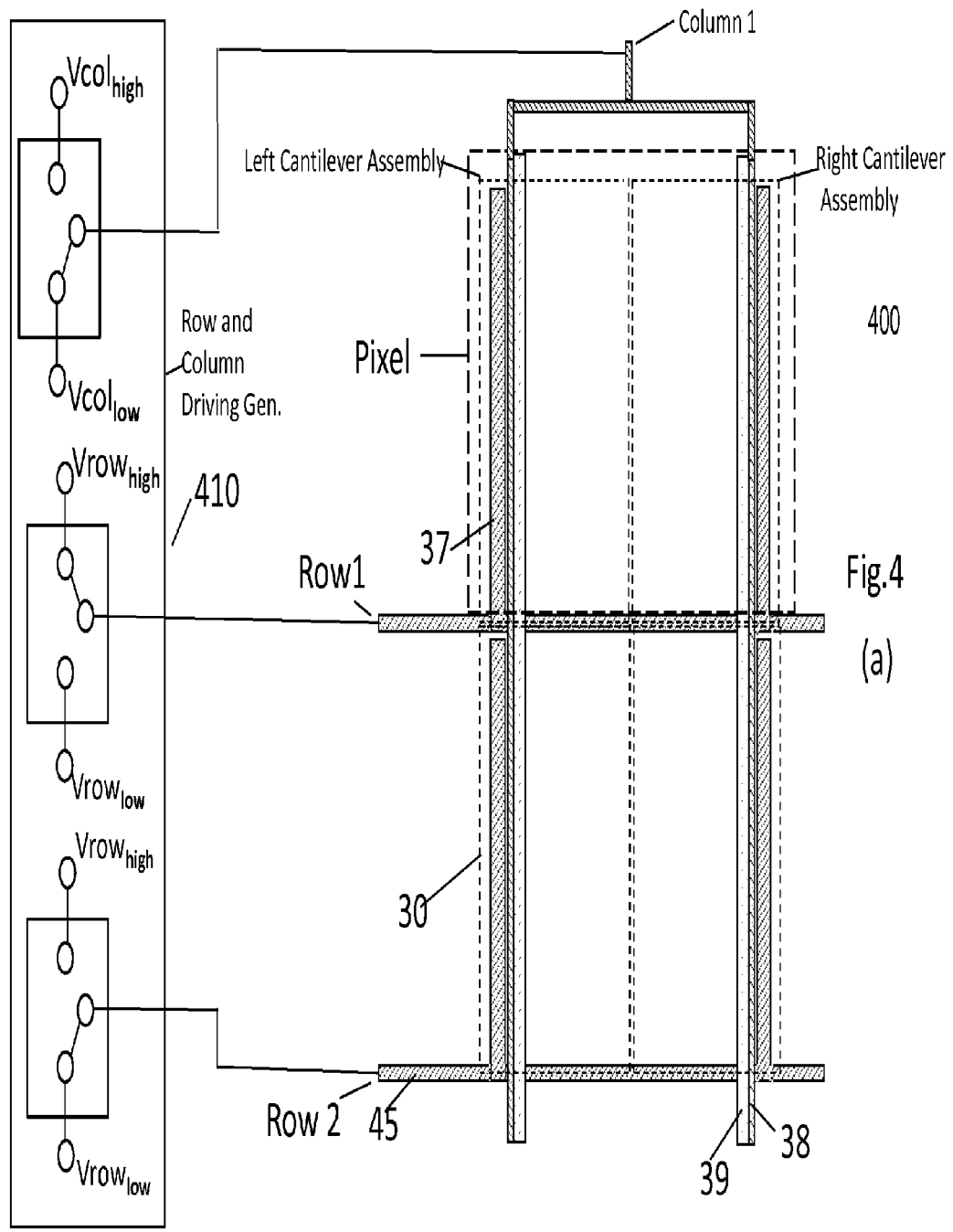
FIGS. 4a and 4b illustrate a top view and a side view, respectively, of a two cantilever pixel in a closed position in accordance with the principles of the invention.
Figure 4:
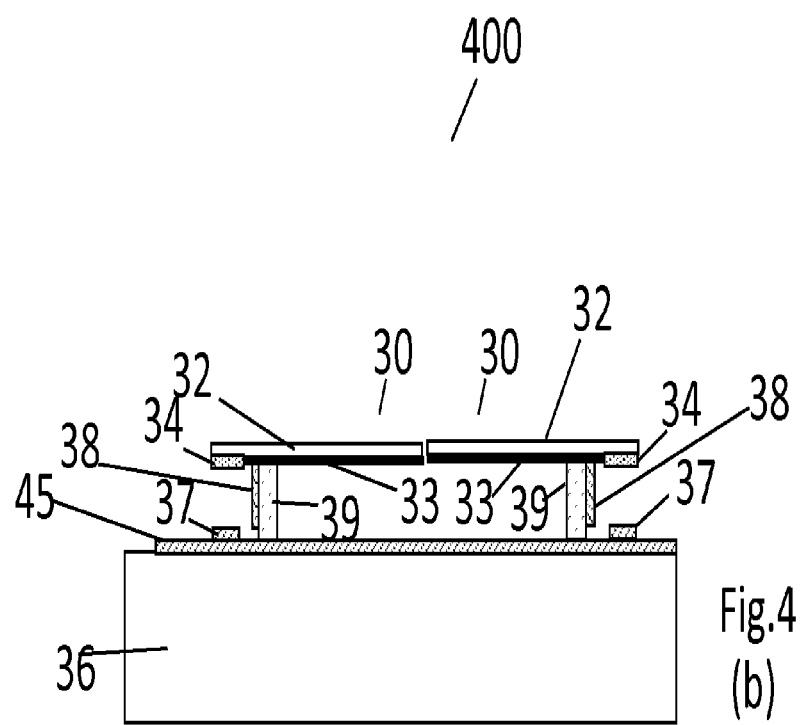

Thus, the combination of three metal lines 37, 32 and 38 in FIG. 4 represents row and column matrix of the capacitances C1 and C2, with every cantilever having its own two-capacitance structure. Together with the top electrode 47 of FIG. 3 (not shown in FIG. 4(b)), a four-electrode circuit to both selectively address pixels and hold them in their on-state position in accordance with the principles of the invention is obtained.

FIG. 5 illustrates an exemplary table of voltages controlling the pixel states. Every individual row (Vrow) column (Vcol), and top electrode, Vt, voltages are chosen to be not sufficient to move the pixel into an on-state. Only substantially simultaneous application of the pixel activation voltages, Vra, Vca and Vt applied respectfully to the row, column and top electrodes relative to the cantilever electrode suffice to snap the pixel into the on-state. To keep the cantilever 30 in the on-state position, the column-to-cantilever electrodes can be held at a smaller voltage Vh (bi-stability effect), while other voltages can be nullified.

The left half of the table in FIG. 5 illustrates the set of voltages applied to row and column electrodes. At Vrow=Vcol=Vh, the pixel is in the off-state (top left). When Vrow=Vra, Vcol=Vca and Vt is appropriately chosen, the pixel moves to the on-state (bottom right). In intermediate situations, i.e. when Vrow=Vh and Vcol=Vca, or Vrow=Vra and Vcol=Vh, the pixel remains in the off-state. In these four cases, the cantilever voltage Vcan is chosen to be zero, while the constant top electrode voltage Vt, typically exceeds or is equal to the voltage Vca. The estimates show that the set of voltages Vra=Vca=Vt=30V is sufficient to switch a pixel into the on-state, and Vcol=Vh=5-10V is sufficient to hold the membrane in this state.

The right four entries in the table shown in FIG. 5 illustrate the case when cantilever 30 is under the voltage of Vcan=Vh. At Vcol=Vrow=Vh the pixels returns into its off-state. The top left entry illustrates this case, while three other states are unused.

To maintain the display integrity and enhance the display life-time, and to minimize the possibility of the cantilever damage or even breakage when the cantilever is rotated to the position normal to the substrate plane, it is important to replace the rotating force by a more benign, bending, force.

Figure 6:
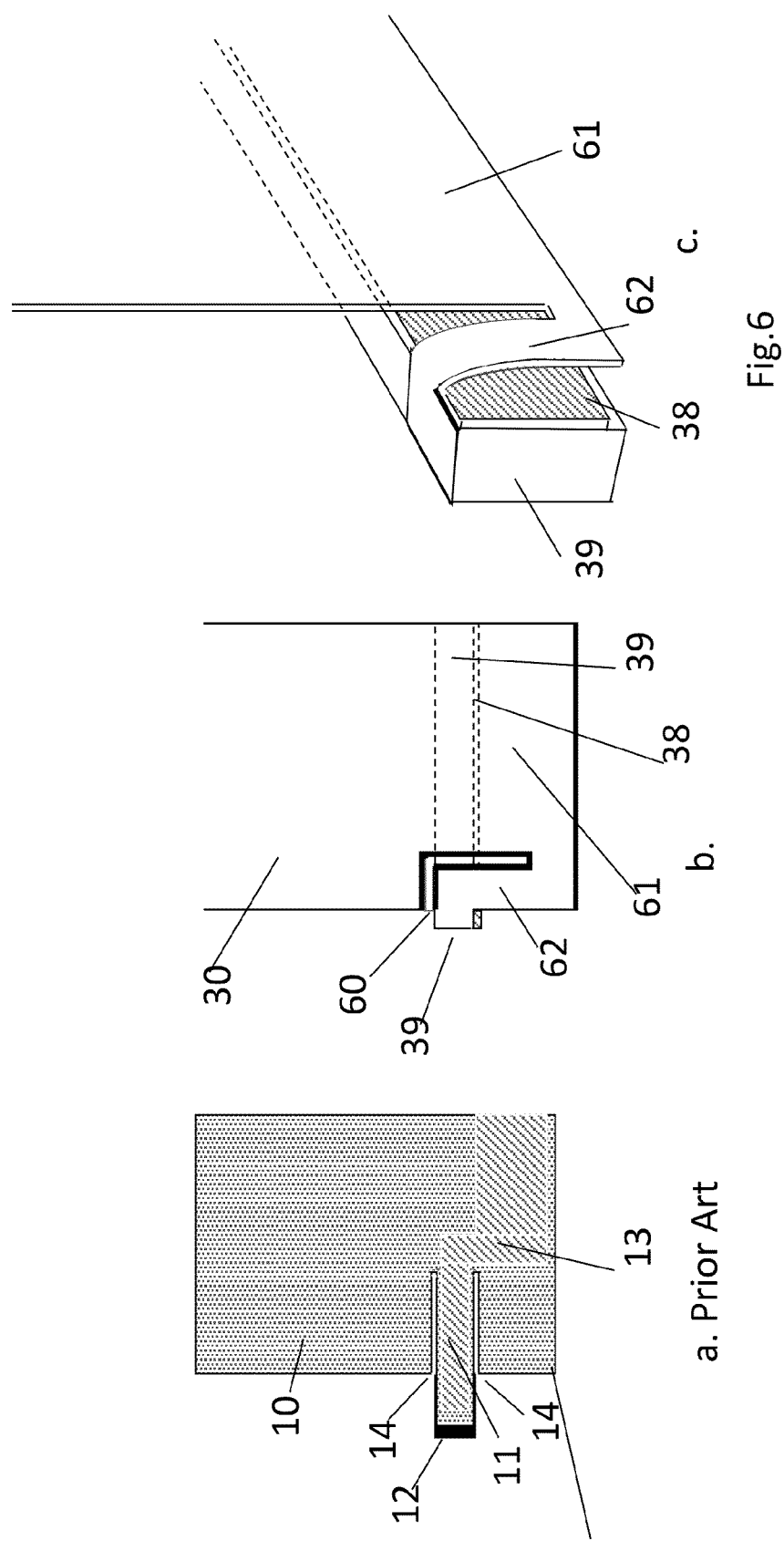

FIGS. 6(b) and 6(c) illustrate two different hinge designs in accordance with the principles of the invention. FIG. 6a illustrates a conventional hinge design as described in the previously referred to US Patents. In this case, the hinge stripe 11 is made from the same material as the cantilever 10 by cutting two slits 14 on both sides of the stripe. Every hinge is attached to the post 12. A zigzag stripe of the metal layer 13 is also attached to the same bar 12 and continues beyond the pixel area through the entire display length to form the column line of the display. When the cantilever 10 is turned to the on-state position (normal to the plane of the drawing) the hinge stripe 11 is subjected to a dangerous twisting force and thus may have a tendency to break or malfunction.

To reduce the probability of damaging the hinge, the twisting force of the hinge is replaced, according to the present invention, by a much less dangerous bending force as shown in FIGS. 6(b) and 6(c).

With reference to FIG. 6(b), the L-shaped cut 60 within the cantilever plate 30 forms a vertical stripe 62 attached to the top surface of the bar 39. In FIG. 6(b) this bar is shown horizontally with dashed lines. Together with the metal layer 38 on its vertical wall, the bar 39 extends over the whole display and forms the column line of the pixel matrix, (see FIG. 4). FIG. 6(c) shows a perspective view of the cantilever 61 which is attached to the bar 39 through the hinge 62. The hinge 62 is subjected to the bending force as the cantilever moves to the up-right position. It should be noticed however that other hinge designs are also possible depending on the applications.

In another aspect of the invention, the cantilever design presented herein may provide for producing gray levels for display. Two exemplary methods are considered, according to the present invention, to produce the gray levels. In a first method, pixel dithering is considered, when several pixels are involved to form shades of a black color on the screen. In a second method, each pixel area is sub-divided into small uneven portions, each having at least one cantilever, to form independently controlled sub-pixels within a single original pixel. The first approach has the advantage of its simplicity, since no pixel change is required. The second method requires pixel modifications, as shown in FIG. 7.

Figure 7:
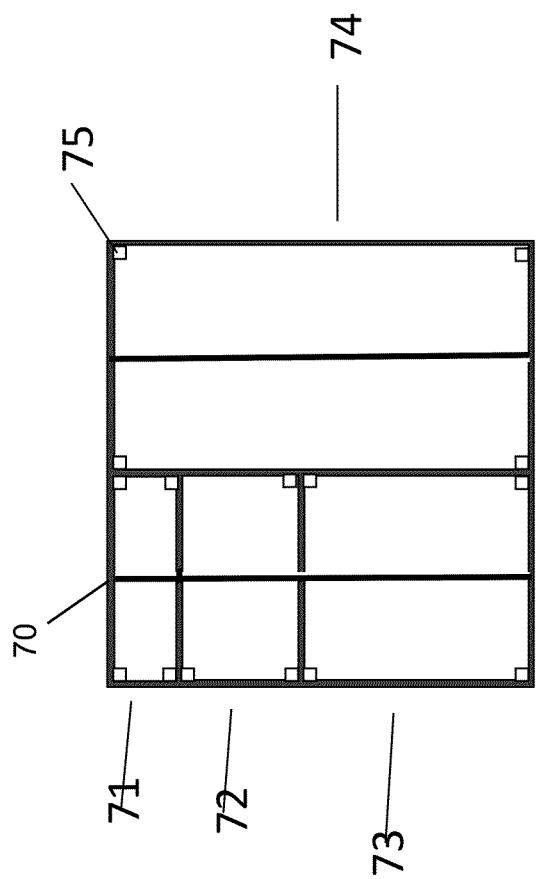
FIG. 7. illustrates a pixel structure with four independently controlled pairs of cantilevers in accordance with the principles of the invention.

FIG. 7, illustrates an exemplary configuration of sub-pixels 71, 72, 73 and 74 within pixel 70. In this illustrated example, each sub-pixel occupies different pixel areas and each sub-pixel contains two cantilevers. Every cantilever is endowed with two hinges 75 and is electrically controlled through the row and column matrix, as previously described. The width of the right pixel 74 is unequal to the width of the three sub-pixels on the left (71, 72, 73). In particular, the four sub-pixel design shown in FIG. 7 yields 14 different combinations of shades. These 14 different combinations of open and closed sub-pixels, together with the condition of fully open and fully closed states, 16 levels of gray state are achieved.

In another aspect of the invention, when a pixel is subdivided into three different sub-pixels (not shown) one obtains eight total gray levels. Accordingly, different levels of gray scale may be achieved by subdividing the pixel into an appropriate number of sub-pixels.

As is known in the art, the speed of open/closing the cantilever is slowed by the air resistance. In one aspect of the invention, improvement in the speed of operating the cantilever may be accomplished by minimizing the air resistance within the display. This may be performed by keeping the device in a vacuum or replace the air with inert gas having low molecular weight, such as helium (He) or Hydrogen ($H_2$).

In another aspect of the invention, leaving the air pressure within the display unchanged, small multiple holes may be incorporated into the cantilever. The holes are selected to be small enough so as not to affect the total white color reflectivity of the cantilever. Since the air resistance is linearly proportional to the cantilever speed, the hole distribution over the cantilever pad may be a linear function of the distance from the center of rotation (rotational means in FIG. 3).

Figure 8:
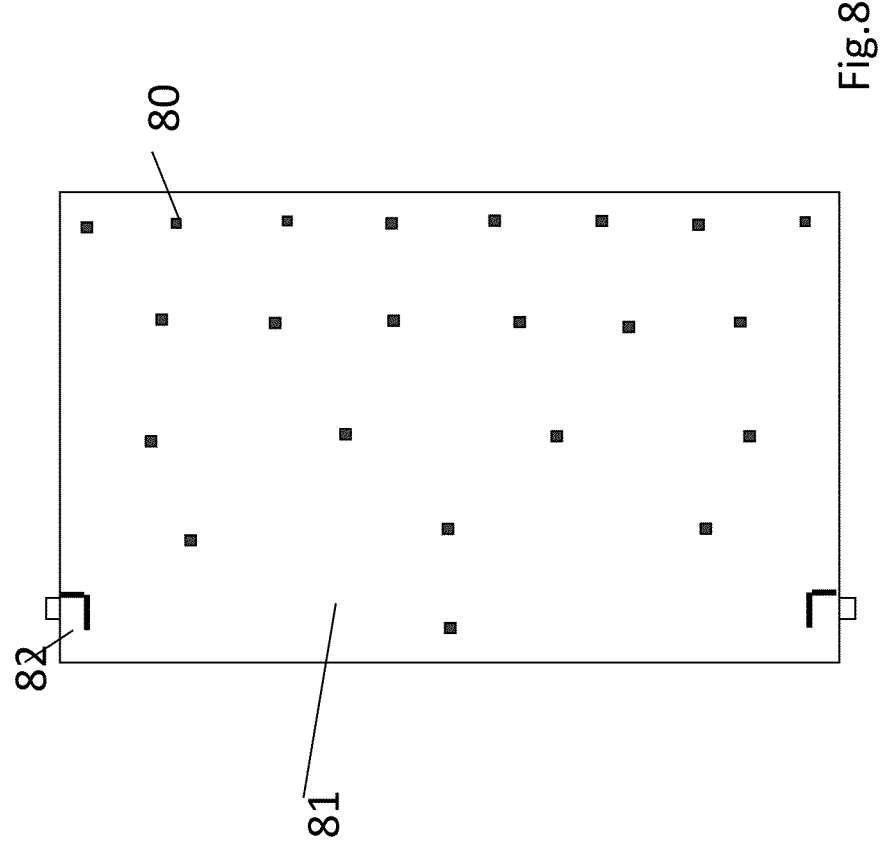
FIG. 8 illustrates a plurality of the small holes to minimize the air resistance in accordance with the principles of the invention.

FIG. 8 illustrates an exemplary distribution of holes 80 within cantilever 81 with hinges 82. The number of holes 80 on the cantilever 81 linearly decreases toward the side of the hinges 82.

Since the proposed display consumes the energy only during the process of placement of the image on the screen, it is considered to be extremely power efficient. This is a basic device feature, particularly suitable for e-book applications.

To maintain the device life time practically infinite in accordance with the principles of the invention, a solar battery for feeding a main battery may be incorporated to the display. The solar battery may provide electrical energy to the main battery whenever the display is exposed to the light, i.e. during reading process or simply placing the device under any ambient light source. Such a solar battery charger concept is widely used in the low power consumption electronics, such as, for instance, electronic calculators. The same idea can be applied to the invention described herein. Simple battery circuitry can be used to implement this concept (not shown).

The important feature of the e-book display is a whiteness of the electronic page. In accordance with the principles of the invention, a white color is controlled essentially by the pixel area occupied by the white color relative to the entire pixel area, which includes the black color intervals between the pixels.

In an exemplary display, the distance d between the pixels is determined by the lithography resolution and typically is d=4 μm. This parameter is important for the total pixel whiteness. The black area per pixel is determined by the value of Ld, where L is the pixel pitch in the display. Having for the simple estimates L=150 μm and the cantilever width T=L/2=75 μm, one can obtain the whiteness of the pixel area as $$[(L^2-3Ld)/L^2] \times W = 0.92 W,$$

where W is the whiteness of the pixel white paint on top of the cantilever.

For a high quality white paper, the parameter W is close to 1.

The blackness of the paper is essentially controlled by the paper light reflection under an ambient light illumination conditions. In the display case, the light reflection B from the top glass controls the e-paper blackness. Typically, this parameter is in the range of B=0.05. The resultant contrast ratio R will be 0.92 W/B approximately 18.4 W or 18 W. In these estimates, the small area of black color L-shaped notches 60 defining the hinges in FIG. 6b has been neglected.

To further increase the contrast ratio R, according to the present invention, a whiteness enhancement process may be employed, when the parameter W becomes larger than unity, W>1. For that purpose, the white color coating contains a small amount of the fluorescent molecules emitting white light under UV-illumination (348 nm wavelength). Since the ambient light contains some portion of the UV light such a fluorescence makes the parameter W>1.

The MEMS display, according to the present invention, can be designed to produce a color display. The difficulty of such a design is to maintain a good contrast ratio for the display in its black-and-white mode. This can be done by altering the top pixel color to black (off state), as shown in FIG. 9(a), while Red, Green, Blue and White color pixels produce the on-state of the pixel, FIG. 9(b). The cross-sectional views on the bottom of FIGS. 9(a) and 9(b) are also presented, to illustrate the off-state of the super pixel FIG. 9(a) and its on-state, FIG. 9(b), with all the cantilevers in the upright position. In the bottom of FIG. 9(b), a cross-sectional view of white and green pixels along the line OO' are shown.

Four (sub-)pixels are involved in making a single color super pixel 90. In every sub pixel of the super pixel, the bottom electrode 91 on the substrate 92 is coated with its appropriate color (e.g. Red, Green, Blue and White). It is important that the bottom surface 93 of each cantilever is also colored with the same color as the bottom electrode on the substrate. This provides a large viewing angle.

Another advantage of such a design is a high contrast ratio in the black/white regime of operation. That is, Red, Green and Blue colors of sub-pixels compose White color, so that together with a fourth, white color pixel (bottom left in FIG. 9b), the white color in the on-state is formed with all four pixels, thereby producing a good White. A good Black, (see FIG. 9(a)), is also formed by all four pixels in their off-state.

To obtain pure Red, Green and Blue colors, the respected pixels in the super pixel are to be opened. Opening other pixels will create some mixed colors, which can be additionally varied by opening the White color pixels.

It would be appreciated that the voltages discussed herein may be applied to the appropriate pixel elements with corresponding pixel driver elements 310 (FIG. 3). Such pixel driver element may be implemented in hardware, firmware or as software or computer code that can be stored in a recording medium such as a CD ROM, an RAM, a floppy disk, a hard disk, or a magneto-optical disk or computer code downloaded over a network originally stored on a remote non-transitory recording medium or a non-transitory machine readable medium and to be stored on a local recording medium, so that the methods described herein can be rendered in such software that is stored on the recording medium using a general purpose computer(s), or a special processor(s) or in programmable or dedicated hardware(s), such as an ASIC or FPGA. As would be understood in the art, the computer(s), the processor(s), microprocessor controller(s) or the programmable hardware(s) include memory components, e.g., RAM, ROM, Flash, etc. that may store or receive software or computer code that when accessed and executed by the computer(s), processor(s) or hardware(s) implement the processing methods described herein. In addition, it would be recognized that when a general purpose computer(s) accesses code for implementing the processing shown herein, the execution of the code transforms the general purpose computer(s) into a special purpose computer(s) for executing the processing shown herein.

In addition, although it has been discussed that the voltages provided by the pixel drivers are provided to the pixel electrodes substantially simultaneously, it would be also appreciated that the drivers may include switchable power sources 410 (FIG. 4(a)) that apply voltages to the electrodes in a timed manner such that the cantilever may be initially moved based on the application of certain voltages and, some or all of the voltages may be reduced and/or removed as the cantilever moves from a first position to second position.

The terms "a" or "an" as used herein are to describe elements and components of the invention. This is done merely for convenience and to give a general sense of the invention. The description herein should be read to include one or at least one and the singular also includes the plural unless indicated to the contrary.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

While there has been shown, described, and pointed out fundamental and novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A display device, comprising:
   a two-dimensional matrix of pixels, each pixel comprising:
      a substrate,
      two cantilevers of a rectangular shape made from a combination of metal and dielectric films, each cantilever forming a first electrode of the pixel, said two cantilevers being parallel to, and above, a plane of the substrate, wherein an active side of every cantilever, positioned farthest from a pixel center, is used to attach said cantilever to the substrate and facilitate its rotation;
      a dielectric bar, substantially normal to said substrate, located beneath each of the two cantilevers at said active side and extending over a display area in the direction parallel to said active side, said bar having on its wall a second electrode facing said active side and extending through the display device thereby forming a column line of the display device;
      a hinge located at each of two cantilever corners on said active side of each of said two cantilevers and made from a same material as the cantilevers to hold the cantilevers attached to corresponding ones of said dielectric bars, said hinges providing conductance from said first electrode of the pixel to an electrode common to all the pixels in the display device and facilitating electro-static cantilever rotation around said hinges from an original cantilever position parallel to said substrate plane into a position normal to said substrate plane;
      a third electrode, placed on the substrate, as a metal line at said active side adjacent, and parallel, to said dielectric bar to form a first capacitance between said first electrode of the pixel and said third electrode;
      an additional metal line, disposed perpendicular to said column lines on said dielectric bars and connecting said third electrodes in one row, while keeping said third electrodes electrically disconnected from other rows, to form the row lines of the display; and
      a top conducting and optically transparent layer disposed on a bottom surface of a transparent display cover at a known distance from a plane of said cantilevers, said distance being sufficient to accommodate said cantilever in its position normal to the substrate plane, said top conducting layer operating as a fourth electrode forming a second capacitance, said second capacitance between said top conducting layer and said first electrode, wherein rotation around said hinges changes the position of the cantilever from a position parallel to the substrate to a position normal to said substrate.

2. The display of claim 1, wherein the substrate is coated black, and a top surface of said cantilever is coated white.

3. The display device of claim 2, wherein the white coating of the cantilever emits said white light under exposure to ultra-violet light.

4. The display device of claim 1, further comprising:
   means for applying appropriate voltages to selectively chosen row lines and column line; and
   means for applying a constant voltage to said fourth electrode relative to said first electrode.

5. The display of claim 1, wherein a bottom surface of each of said cantilevers is coated black.

6. The display of claim 1, wherein said hinges of each cantilever are formed by making L-shaped cuts at two cantilever corners of said active side of a corresponding cantilever.

7. The display of claim 1, wherein a dielectric material with a high dielectric constant is deposited underneath said first electrode at said active side of the cantilever, said dielectric material in the off-state of the cantilever facing said third electrode on the substrate.

8. The display of claim 1, wherein a plurality of small holes are distributed over said cantilever, wherein a density of said holes linearly decreasing toward said active side of the cantilever.

9. The display of claim 1, further comprising:
   a main display battery and a solar battery, wherein the solar battery is attached to the main display battery to feed said main display battery whenever said solar battery is exposed to light.

10. The display device of claim 1, wherein a super pixel is formed by four sub-pixels wherein, in each sub-pixel, the substrate area and bottom surface of their cantilevers are coated with one of: a red color, a green color, a blue color and a white color.

11. A display comprising a plurality of pixel elements, each of said pixel elements comprising:
- a first substrate comprising:
  - a first conductive layer;
- a second substrate opposite the first substrate, the second substrate comprising:
  - a wall, positioned along an edge of said pixel element, substantially normal to a plane of the second substrate, and
  - a second conductive layer positioned on a first side of said wall; and
  - a third conductive layer positioned on said second substrate facing said first side of said wall;
- a cantilever assembly, rotationally attached to a top of said wall, wherein said cantilever assembly rotates about said wall, the cantilever assembly including:
  - a conductive top layer and a dielectric bottom layer, said conductive top layer representing a fourth conductive layer, and
- means for timely applying a voltage to each of said first, second, third and fourth conductive layers to cause said cantilever assembly to pivot from a first position to a second position.

12. The display according to claim 11, wherein said conductive top layer of said cantilever assembly is of a first color and said second substrate is of a second color.

13. The display according to claim 11, wherein said first position is parallel to said second substrate and said second position is substantially normal to said second substrate.

14. The display according to claim 11, wherein said first substrate and second substrate are spaced apart by a distance to accommodate said cantilever assembly in a position substantially normal to said second substrate.

15. The display according to claim 11, further comprising:
- a plurality of holes distributed over said cantilever assembly, a density of said holes linearly decreasing toward said attachment of said cantilever assembly to said wall.

16. The display according to claim 11, said cantilever assembly further comprising:
- at least one hinge for attaching said cantilever assembly to said wall.

17. The display according to claim 11, wherein each pixel element further comprises:
- a plurality of pixel sub-elements, wherein the top conductive layer of each cantilever assembly in corresponding pixel sub-elements is colored according to a color selected from a group consisting of: red, green, blue and white.

18. The display according to claim 11, wherein said wall comprises:
- a first wall positioned along a first edge of said pixel element;
- a second wall positioned along a second edge of said pixel element, said second edge being opposite to said first edge; and said cantilever assembly comprises:
- a first cantilever rotationally attached to said first wall; and
- a second cantilever assembly rotationally attached to said second wall.

* * * * *